United States Patent [19]

Ohshita

[11] Patent Number: 5,542,620
[45] Date of Patent: Aug. 6, 1996

[54] TAPE THREADING APPARATUS USED IN A TAPE UNIT

[75] Inventor: Masaru Ohshita, Yokohama, Japan

[73] Assignee: Fujitsu Limited, Kawasaki, Japan

[21] Appl. No.: 462,562

[22] Filed: Jun. 5, 1995

Related U.S. Application Data

[63] Continuation of Ser. No. 173,156, Dec. 22, 1993, abandoned, which is a continuation of Ser. No. 728,626, Jul. 11, 1991, abandoned.

[30] Foreign Application Priority Data

Jul. 18, 1990 [JP] Japan .................................. 2-191017

[51] Int. Cl.⁶ .................................................. G11B 15/00
[52] U.S. Cl. ................................. 242/332.4; 242/332.8
[58] Field of Search ................................ 242/195, 197, 242/332.1, 332.4, 332.5, 332.8, 532.6; 360/95; 352/158; 226/92

[56] References Cited

U.S. PATENT DOCUMENTS 4,608,614  8/1986  Rinkleib et al. ........................ 242/195
4,679,747  7/1987  Smith .................................... 242/195

FOREIGN PATENT DOCUMENTS

| | | |
|---|---|---|
| 60-10446 | 1/1985 | Japan . |
| 62-119765 | 6/1987 | Japan . |
| 62-231451 | 10/1987 | Japan . |
| 62-231451 | 10/1987 | Japan . |
| 62-257657 | 11/1987 | Japan . |
| 60-10360 | 1/1988 | Japan . |

*Primary Examiner*—John Q. Nguyen
*Attorney, Agent, or Firm*—Staas & Halsey

[57] ABSTRACT

A tape threading mechanism for a magnetic tape unit uses a cartridge-contained magnetic tape with a leader-block attached at an end of the magnetic tape. The tape threading mechanism pulls out the leader-block from the cartridge, performs a tape threading/unthreading and inserts the leader-block back into the cartridge by way of a threading arm. The threading arm is connected to a rotational axis thereof at a first end. A second end of the threading arm is provided with a pin for carrying the leader-block and includes a linkage of at least two arms. At least one of the two arms has an elastic member which allows the threading arm to expand and contract lengthwise.

17 Claims, 8 Drawing Sheets

TAPE THREADING APPARATUS USED IN A TAPE UNIT

This is a continuation, of application Ser. No. 08/173,156, filed Dec. 22, 1993, now abandoned, which is a continuation of application Ser. No. 07/728,626, filed Jul. 11, 1991, now abandoned.

BACKGROUND OF THE INVENTION

1. Field of the Invention

The present invention is directed to a magnetic tape unit having a single-reel magnetic tape cartridge (i.e., a cartridge having only one reel with a magnetic tape wound thereon, hereinafter referred to as a cartridge) to be used in a computer system file. Particularly, the present invention is directed to an apparatus for threading and unthreading magnetic tape in a cartridge in a magnetic tape unit.

A cartridge is first loaded into a magnetic tape unit. The magnetic tape is then threaded through a threading path and wound on a machine reel of the magnetic tape unit to establish a running path for the magnetic tape. A write or read operation is then performed on the magnetic tape.

With an ever-increasing demand for a small-sized computer system, the demand for a small-sized magnetic tape unit is also increasing. It is an absolute necessity for attaining high reliability that a magnetic tape unit securely perform threading and unthreading of the magnetic tape. Therefore, a small-sized magnetic tape unit threading apparatus is in great demand.

2. Description of the Related Art

FIG. 1, including FIGS. 1(a)–1(c), is a diagram of an outline of a magnetic tape cartridge. FIG. 1(a) is a perspective view of a magnetic tape cartridge; FIG. 1(b) is a sectional view of the magnetic tape cartridge with a leader-block ready to be inserted therein; and FIG. 1(c) is a sectional view of the magnetic tape cartridge with the leader-block inserted therein.

In FIGS. 1(a)–1(c), a single-reel cartridge 1 has a reel with a magnetic tape 2 wound thereon. The end of the magnetic tape 2 is connected to a leader-block 3 which has an opening 3b used for pulling the leader block 3 and thus the magnetic tape 2 out of the cartridge 1. The leader-block 3 is inserted and latched in the cartridge 1.

When the leader-block 3 is pushed into the cartridge opening in the state shown in FIG. 1(b), the tongue 3a of the leader-block 3 rides on and across the cartridge tongue 1a, which is molded synthetic resin, and is latched thereon as shown in FIG. 1(c).

The cartridge tongue 1a has a spring property and supplies a repulsive force when the leader-block 3 is pushed into or pulled out of the cartridge 1. For instance, the ANS Standard stipulates that the insertion force F required to push the leader-block into its latched position in the cartridge should not exceed 1.23 kg.

FIG. 2 is a schematic diagram of a prior art magnetic tape threading mechanism. In FIG. 2, the chain line T is the path along which a magnetic tape is threaded and M is a threading motor.

When the cartridge 1 is loaded in a magnetic tape unit, the magnetic tape 2 is pulled out of the reel of the cartridge 1 and input to the machine reel 4 after being threaded through a tape guide 12a, a magnetic head 13, a tape guide 12b and a tension roller 14.

A panto-arm consisting of a first arm 6, second arm 7, third arm 9 and fourth arm 10 threads the magnetic tape 2. As the panto-arm swings, a pin 8 provided at an end of the panto-arm pulls out the leader-block 3 which is provided at the end of the magnetic tape 2. A guide pin 11 of the panto-arm moves along the guide groove 5a to the machine reel 4 to engage the leader-block 3 with the leader-block groove 4a of the machine reel 4.

The above sequence is reversed for unthreading the magnetic tape. When a flag 16 attached to the second arm 7 comes in front of a photosensor 15, the photosensor 15 detects that the leader-block 3 is inserted and causes the panto-arm to stop swinging.

Accordingly, the conventional threading mechanism has the following problems.

(1) In a threading mechanism using a panto-arm, the magnetic tape has to travel over a long tape path, which makes the magnetic tape unit large in size.

(2) A large insertion force F is required to insert the leader-block 3 into the cartridge 1. To get an insertion force F large enough, the panto-arm must be swung at a high rotational speed at the moment the leader-block 3 is inserted into the cartridge 1. The leader-block insertion, however, may fail if the panto-arm rebounds due to a repulsive force acting on the leader-block 3.

(3) The leader-block insertion may fail due to a dimensional error in the cartridge 1 or a positioning error of the cartridge 1 when loaded into the magnetic tape unit.

(4) Even when the leader-block insertion fails, the above-mentioned photosensor 15 may erroneously detect the flag 16 and incorrectly determine that the leader-block 3 is securely inserted in the cartridge 1. As a result, the magnetic tape unit will malfunction and the computer system will be halted.

The following prior art references are representative of threading apparatuses: Japanese Laid-Open Patents Provisional Publication Nos. 62-257657, 62-119765, 60-10446 and 63-10360.

No. 62-257657 suggests an automatic tape loading mechanism including a tape guide with a difference in level and a spring. The spring absorbs shake and shock which occur when the arm moves along the tape guide.

No. 62-119765 suggests an automatic tape threading device including a linkage of two arms and a guide groove. This reference, however, does not teach the elastic member of the present invention.

No. 60-10446 suggests a magnetic tape threading device which threads a magnetic tape by guiding a linkage arm assembly along a guide groove (cam track means). This reference, however, does not teach the elastic member of the present invention.

No. 63-10360 suggests a tape drive device including a threading arm which consists of a linkage of two arms and has a threading motor connected at an end and a pin for pulling the leader-block. This reference, however, does not teach the elastic member of the present invention.

SUMMARY OF THE INVENTION

It is an object of the present invention to provide a mechanism for securely locking a threading arm when a leader-block is to be latched in a cartridge.

It is another object of the present invention to provide a mechanism for correctly determining whether or not the leader-block 3 is securely inserted in the cartridge 1.

It is still another object of the present invention to provide a small-sized threading mechanism.

It is a further object of the present invention to provide a small-sized and highly reliable magnetic tape unit.

The present invention achieves these objects by providing a threading mechanism for pulling out from a cartridge a leader-block attached at an end of a magnetic tape, threading/unthreading the magnetic tape and inserting the leader-block back into the cartridge, the present invention provides a threading arm which is connected to a rotational axis thereof at a first end and provides a pin for carrying the leader-block at a second end and comprises a linkage of a plurality of arms, at least one of the arms having an elastic member that allows the threading arm to expand and contract lengthwise.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 1(*b*) is a sectional view of the magnetic tape cartridge in FIG. 1(*a*) in which a leader-block is to be inserted therein;

FIG. 1(*c*) is a sectional view of the magnetic tape cartridge in FIG. 1(*a*) having the leader-block inserted therein;

FIG. 7(*b*) is a detailed diagram of the threading arm according to the second embodiment of the present invention.

Throughout the above-mentioned drawings, identical reference numerals are used to designate the same or similar components.

DESCRIPTION OF THE PREFERRED EMBODIMENTS

Figure 1A:
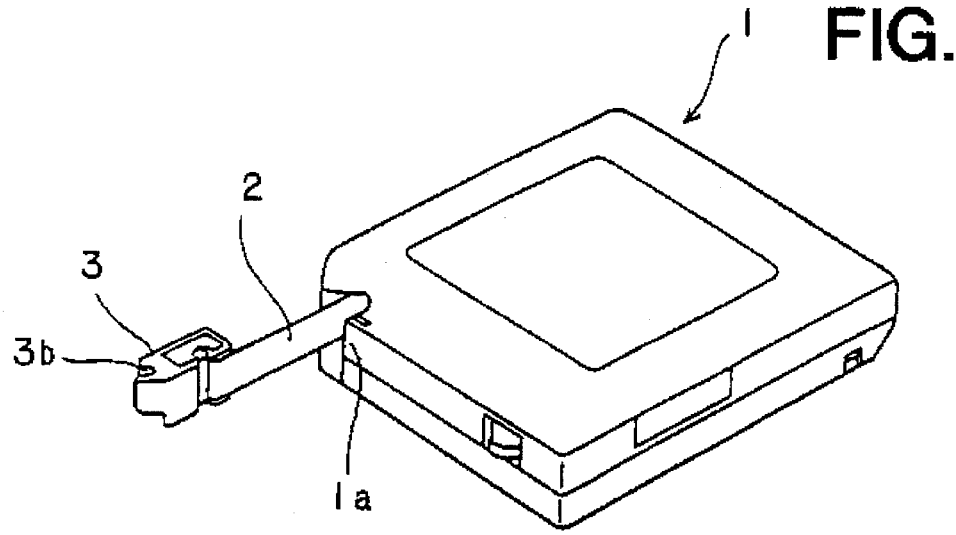
FIG. 1(*a*) is a diagram of an outline of a magnetic tape cartridge.
Figure 1B:
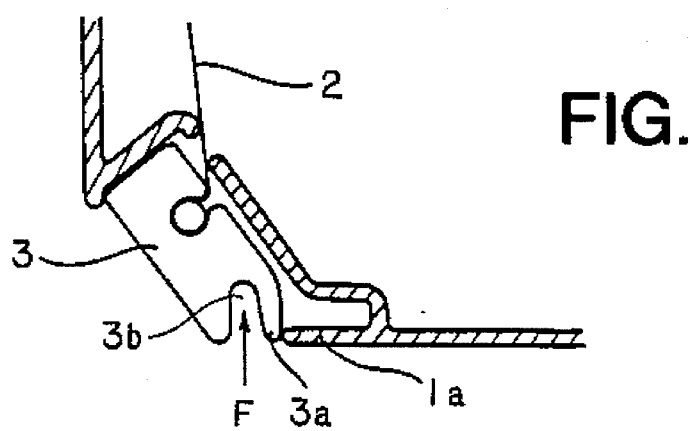
Figure 1C:
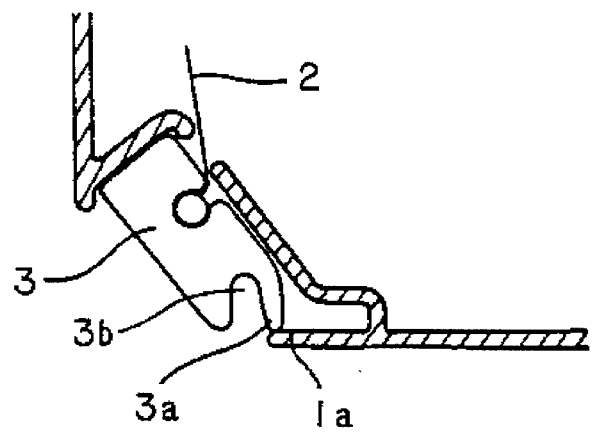
Figure 2:
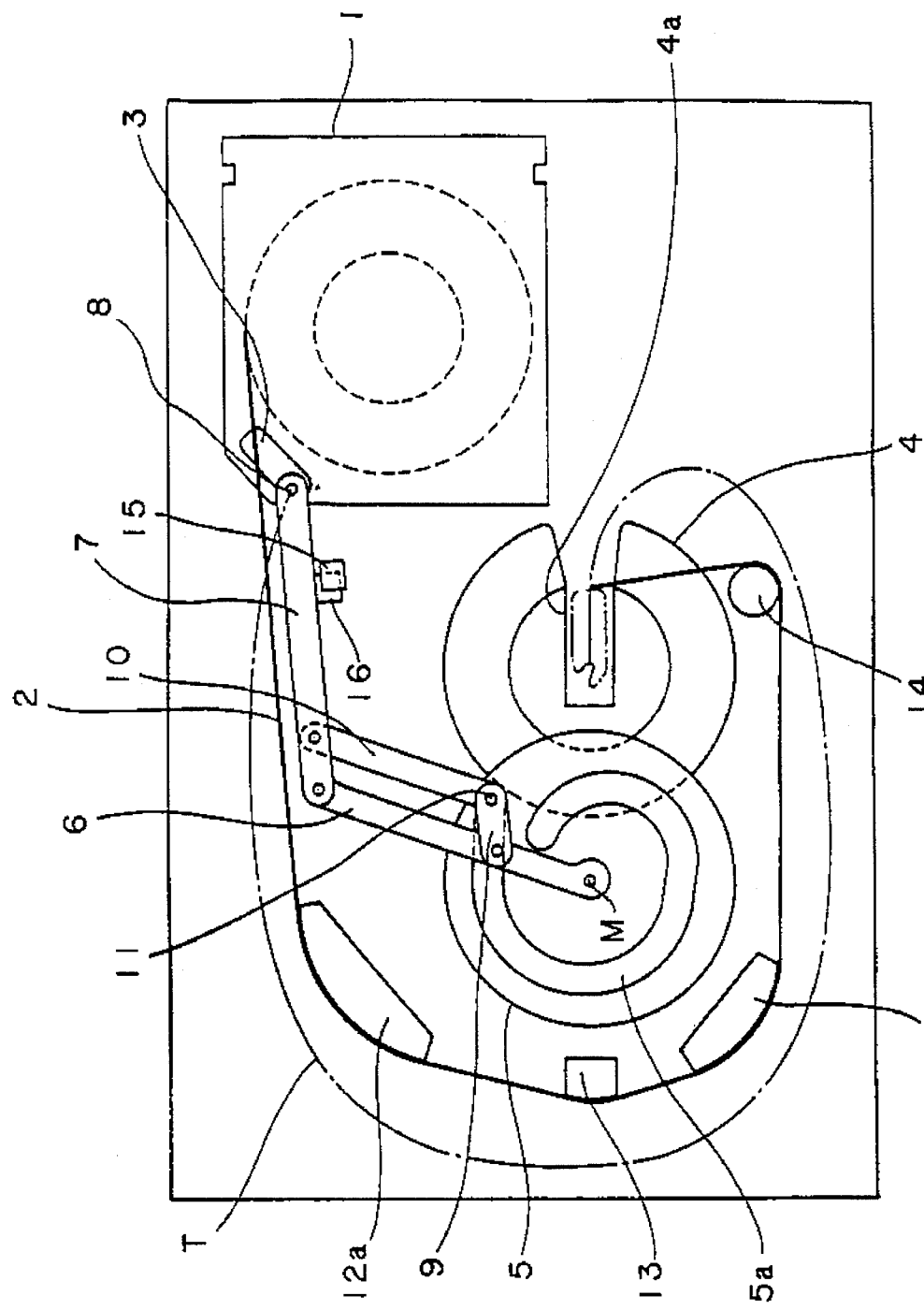
FIG. 2 is a diagram of prior art magnetic tape threading mechanism.
Figure 3:
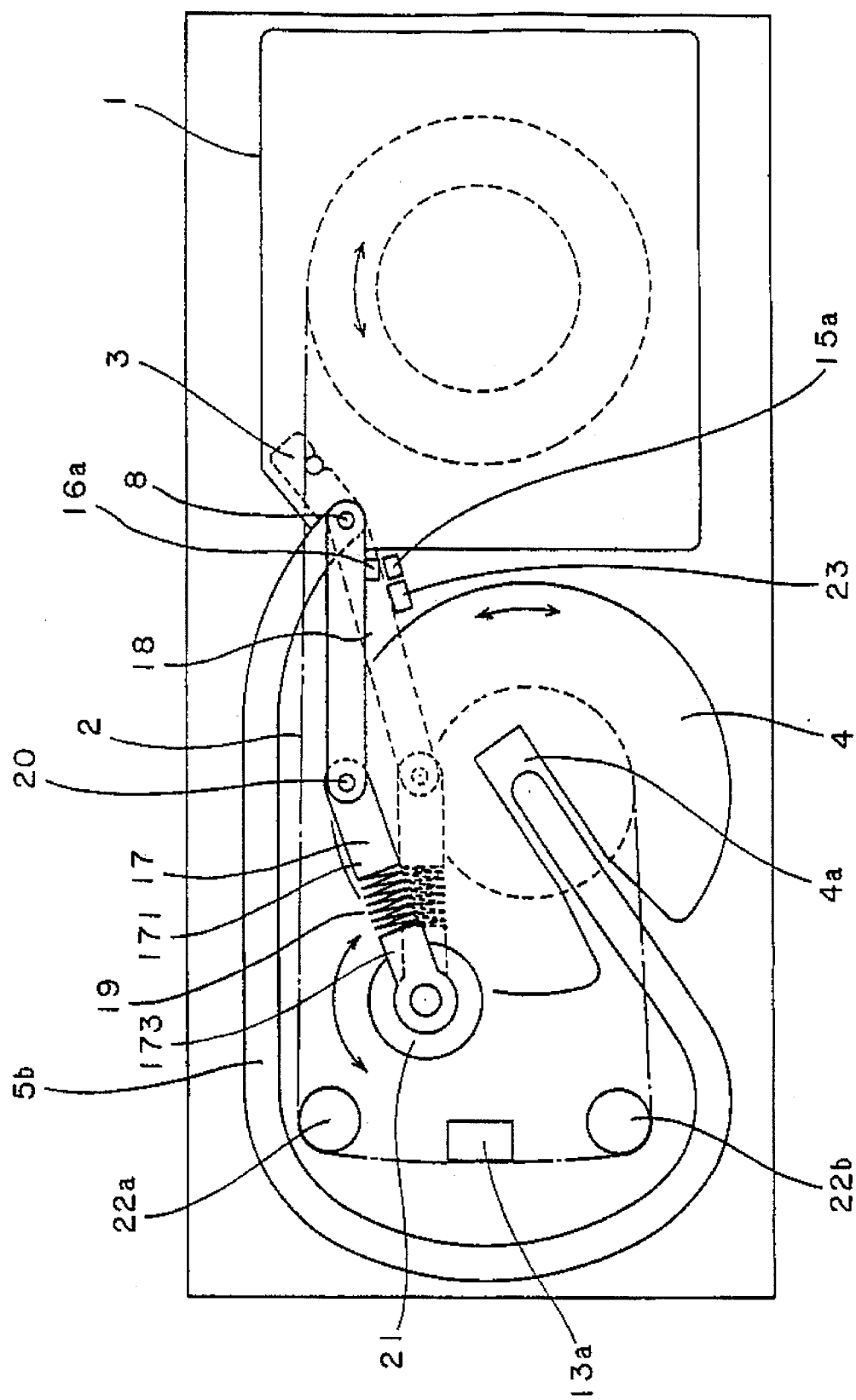
FIG. 3 is a diagram of a magnetic tape threading mechanism according to a first embodiment of the present invention.

FIG. 3 is a diagram of a magnetic tape threading mechanism according to a first embodiment of the present invention. The magnetic tape threading mechanism of the present invention comprises a threading arm including first, second and third arms 171, 18 and 173 which pull the leader-block 3 out of the cartridge 1 and threads a magnetic tape. For easy understanding, the first arm 171, an elastic member 19, and the third arm 173 are represented, in composite, by an arm 17, and the second arm is represented by an arm 18. The arm 17 is connected to a threading motor 21 which swings the linkage (the threading arm including the two arms 17 and 18 and the node 20) and the arm 18 is provided with a pin 8 for pulling the leader-block 3 out of the cartridge 1 by engaging the leader block openings 3*b*.

At least one of the arms 17 and 18 is provided with the (e.g., arm 17 in FIG. 3) elastic member 19 which expands and contracts lengthwise along the threading arm including the arms 17 and 18. The total length of the arms 17 and 18 is set longer than the distance between the rotational axis of the threading arm and a leader-block pickup position where the leader-block 3 is latched in the cartridge 1.

A guide groove 5*b* for guiding the pin 8 is provided along the threading path between the leader-block pickup position and a leader-block engaging groove 4*a* of machine reel 4. The operation of the threading mechanism and its control of the leader-block insertion is now explained.

The threading arm, including arms 17 and 18, swings and carries the leader-block 3 into the cartridge opening. The arms 17 and 18, which are doglegged at this point, straighten by compressing the elastic member 19, become reversely doglegged again and finally stop at a position where the arm 18 strikes against a stopper 23. A sensor 15*a* for detecting the threading arm is provided slightly before the position where the arm 18 comes in contact with the stopper 23. The sensor 15*a* causes the threading motor 21 to stop upon detecting the arm 18.

The operation of the threading mechanism and how it threads and unthreads the magnetic tape 2 is explained with reference to FIG. 3. When threading the magnetic tape 2, the threading motor 21 rotates counterclockwise to make the arm 17 pull the arm 18 by means of node 20. The pin 8 provided at the end of the arm 18 pulls the leaner-block 3 out of the cartridge 1, travels along the guide groove 5*b* while pulling the leader-block 3 and engages the leader-block 3 with the leader-block engaging groove 4*a* in the machine reel 4. Tape guides 13*a* and 22*a* and 22*b* guide the tape into or out of the machine reel 4.

When unthreading the magnetic tape 2, that is, disengaging the magnetic tape 2 from the groove 4*a*, the threading motor 21 rotates clockwise. The pin 8 travels back along the guide groove 5*b* while pulling the leader-block 3, and inserts the leader-block 3 into the cartridge 1. To insert the leader-block 3 into the cartridge 1, the arms 17 and 18 push the leader-block 3 against a repulsive force caused by a tongue provided in the cartridge 1, causing a shock to both the cartridge 1 and the arms 17 and 18. The elastic member 19 provided on at least one of the arms 17 and 18 expands and contracts lengthwise along the respective arms, and absorbs the shock, thus preventing the arms from rebounding.

The threading mechanism of the present invention absorbs shock which would hinder the leader-block 3 from being inserted into the cartridge 1. Thus, the present invention effectively inserts the leader-block 3 with a small rotational torque. The threading mechanism also has a self-lock function using the stopper 23 and, thus, securely inserts the leader-block 3 into the cartridge 1 as shown in FIG. 3.

Figure 4:
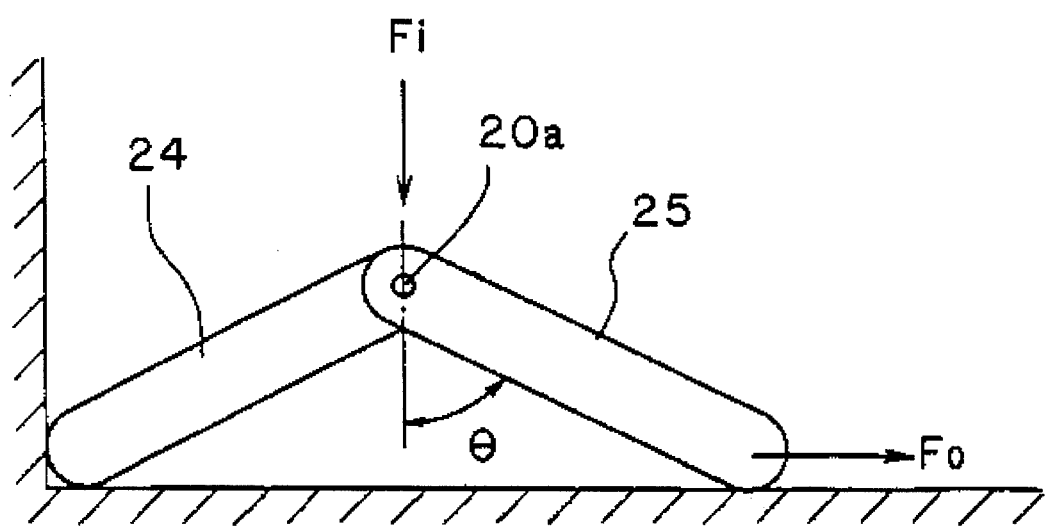
FIG. 4 is a diagram for explaining the principle of the forces acting on a linkage.

The leader-block insertion force caused by the threading arms 17 and 18 will be explained with respect to FIG. 4. FIG. 4 is a diagram for explaining the principle of the forces acting on the linkage.

As shown in FIG. 4, when a linkage, including arms 24 and 25 which are rotatably coupled by a node 20*a*, is doglegged and placed on a floor with an uncoupled end of the arm 24 pressed against a wall, a vertical force Fi applied to the node 20a causes a horizontal force Fo to act on an uncoupled end of the arm 25. The force Fo is expressed as follows:

$$Fo = Fi \sin \Theta/2 \cos \Theta$$

Where the arm 24 and arm 25 are equal in length and a frictional force applied to the arm 25 by the floor surface is neglected. Therefore, the closer the angle $\Theta$ is to $\pi/2$ (radian), a larger force Fo can be obtained with a small force Fi. The force Fo is a leader-block insertion force which the linkage generates.

Figure 5A:
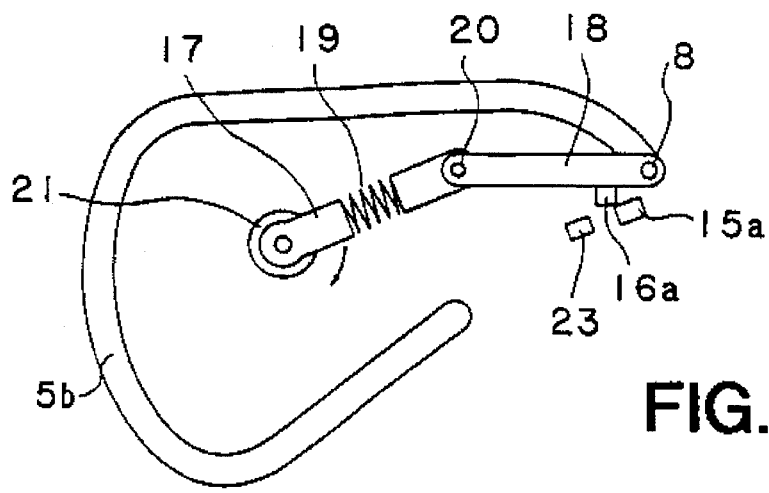
FIGS. 5(*a*)–5(*c*) are diagrams illustrating a threading operation according to the first embodiment of the present invention.
Figure 5B:
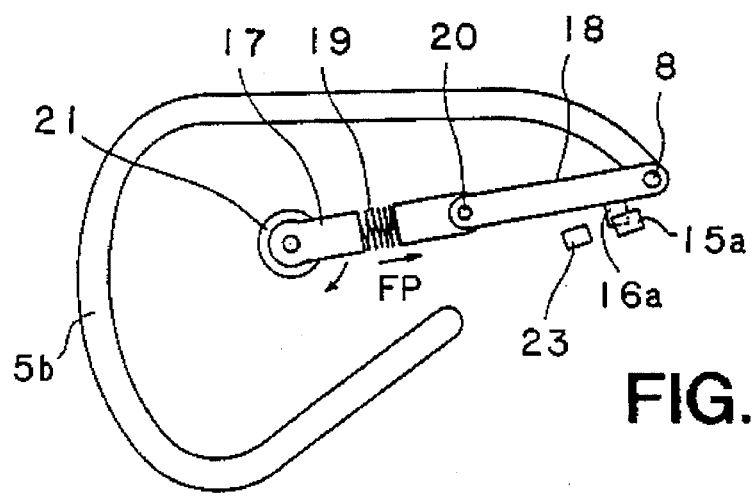
Figure 5C:
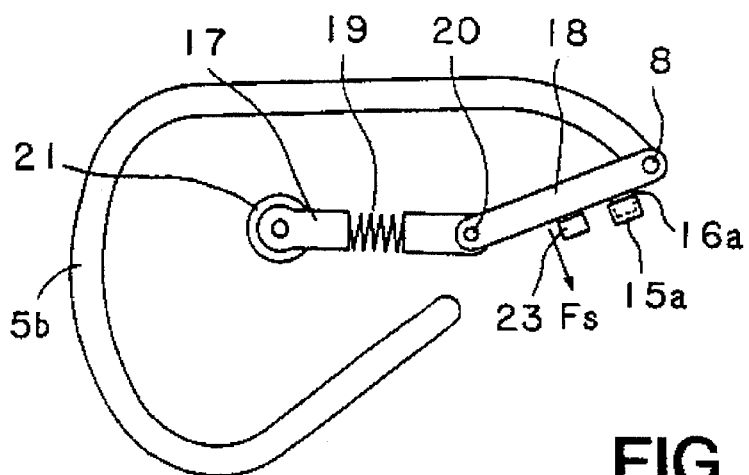

The self-lock function of the threading operation will be explained with respect to FIGS. 5(a)–5(c). FIGS. 5(a)–5(c) are diagrams illustrating a threading operation according to the first embodiment of the present invention. FIGS. 5(a), 5(b) and 5(c) illustrate the threading operation (a leader-block insertion operation).

FIG. 5(a) is a diagram of a leader-block insertion starting stage. The threading motor 21 rotates clockwise which makes the pin 8 carry the leader-block 3 to the cartridge opening. The arms 17 and 18 are doglegged at this point since the total length of the arms is longer than the distance between a leader-block pickup position and the rotational axis of the arm 17.

FIG. 5(b) is a diagram of a leader-block inserting stage. The threading motor 21 continues to rotate and the doglegged arms 17 and 18 straighten while compressing the elastic member 19.

The threading arm including arms 17 and 18 pushes the leader-block 3 into the cartridge 1 with a force Fp which is equal to the force compressing the elastic member 19. That is, the leader-block insertion force depends on the elasticity of the elastic member 19. Therefore, the elastic member 19 should be designed so that the force Fp provides a desired leader-block insertion force.

A rotational torque supplied by the threading motor 21 to the arm 17 is small compared with the force Fp. Thus, a small-sized motor having a small torque can be used for a threading motor.

FIG. 5(c) is a diagram of an arm self-locking stage. As the threading motor 21 continues rotating, the arms 17 and 18 become reversely doglegged after passing the straight state and stop swinging upon contacting the stopper 23.

When the arms 17 and 18 become slightly doglegged immediately after passing the above-mentioned straight state, the arms 17 and 18 and threading motor 21 receive a clockwise rotational force due to a repulsive force of the elastic member 19. Thus, the force Fs which presses the arm 18 to the stopper 23 can always be obtained without a rotational torque output from the threading motor 21 and, therefore, the threading mechanism can maintain a stable self-locking state.

Next, the threading mechanism controlling the leader-block insertion is explained. As described above, when the arms 17 and 18 become slightly doglegged after passing the straight state, the force Fs which presses the second arm 18 to stopper 23 can always be obtained, even if a rotational torque is not output by the threading motor 21.

A sensor 15a is provided at a position slightly before the position where the threading arm becomes reversely doglegged and contacts the stopper 23 after passing the straight state. The threading motor 21 stops rotating when the sensor 15a detects the threading arm by detecting a flag 16a provided on the arm 18. Thus, the threading mechanism enters a stable self-locking state even if the threading motor 21 stops rotating after the sensor 15a detects the threading arm.

When the threading mechanism enters the self-locking state after the threading motor 21 stops, the leader-block 3 is pushed into the cartridge 1 by the force Fp of the elastic member 19. Accordingly, when the sensor 15a continues to detect the threading arm, it is determined that the leader-block 3 has been securely inserted into the cartridge 1.

Figure 6:
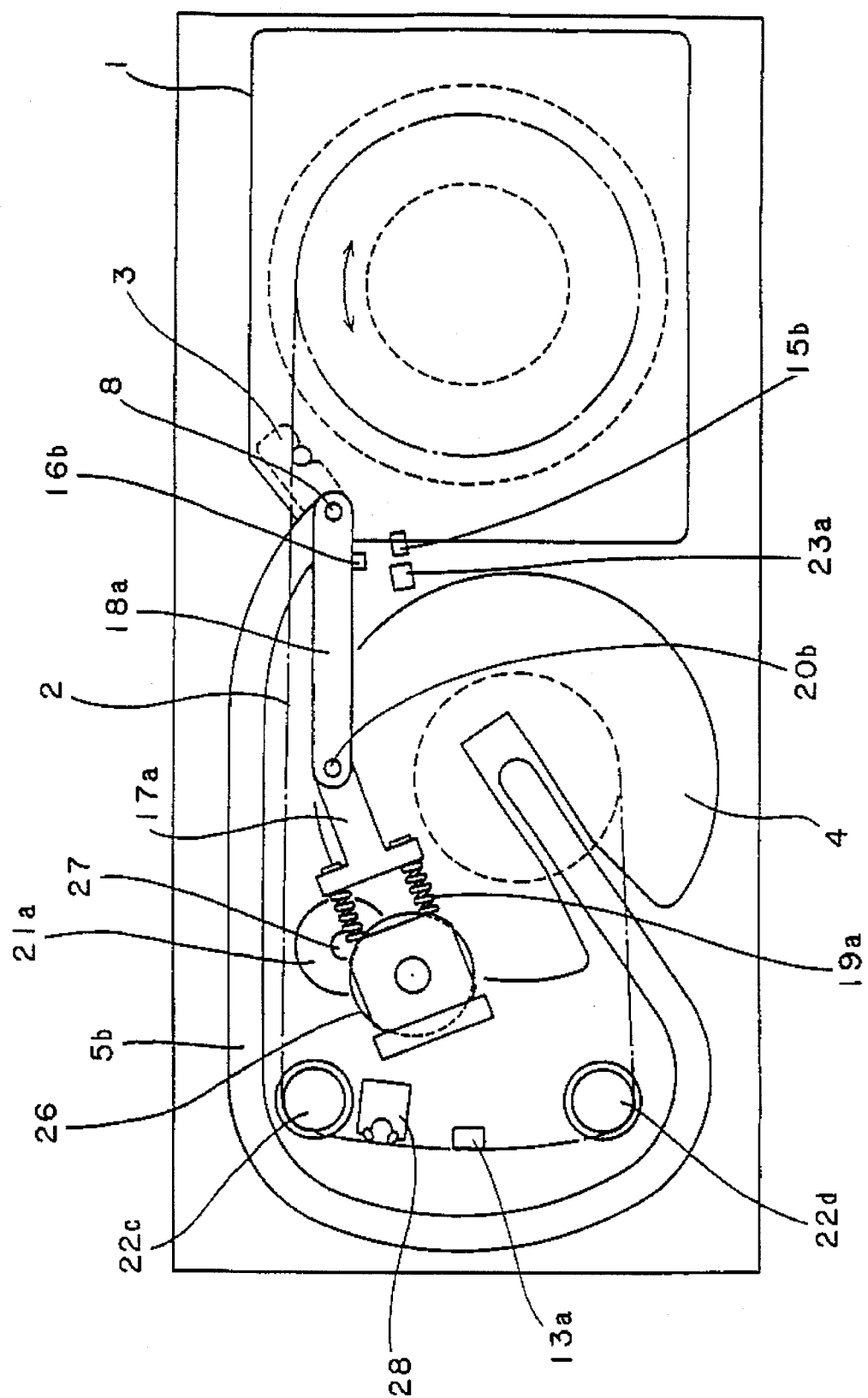
FIG. 6 is a diagram of a magnetic tape threading mechanism according to a second embodiment of the present invention.

FIG. 6 is a diagram of a magnetic tape threading mechanism according to a second embodiment of the present invention. An elastic member including springs 19a is provided on the first arm 17a of the threading arm. A driven gear 26 is provided on the rotational axis of the first arm 17a and a driving gear 27 which engages the driven gear 26, is provided on the threading motor 21a. The rotational speed is reduced via the driving gear 26 and driven gear 27, to generate a large force for swinging the threading arm.

A stopper 23a (FIG. 6) for stopping the threading arm is provided where the second arm 18a is required to stop. The second arm 18a has a flag 16b at its end which is detected by a photosensor 15b to detect the second arm 18a. The position where the sensor 15b detects the flag 16b is set slightly before the position where the second arm 18a strikes the stopper 23a. The remaining elements having the same reference numerals as those in the previous drawings are not explained. 13a along with 22c and 22d are tape guides for guiding the magnetic tape.

Figure 7A:
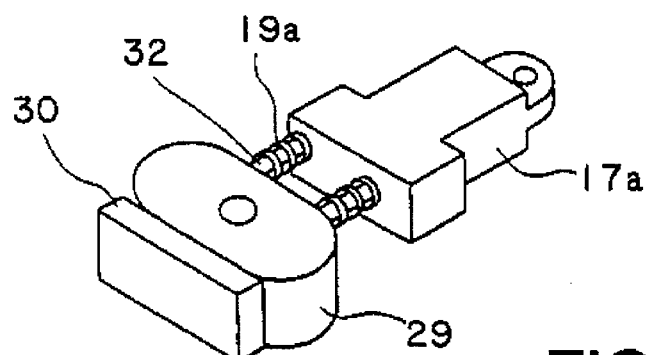
FIG. 7(*a*) is a diagram of a threading arm according to a second embodiment of the present invention.
Figure 7B:
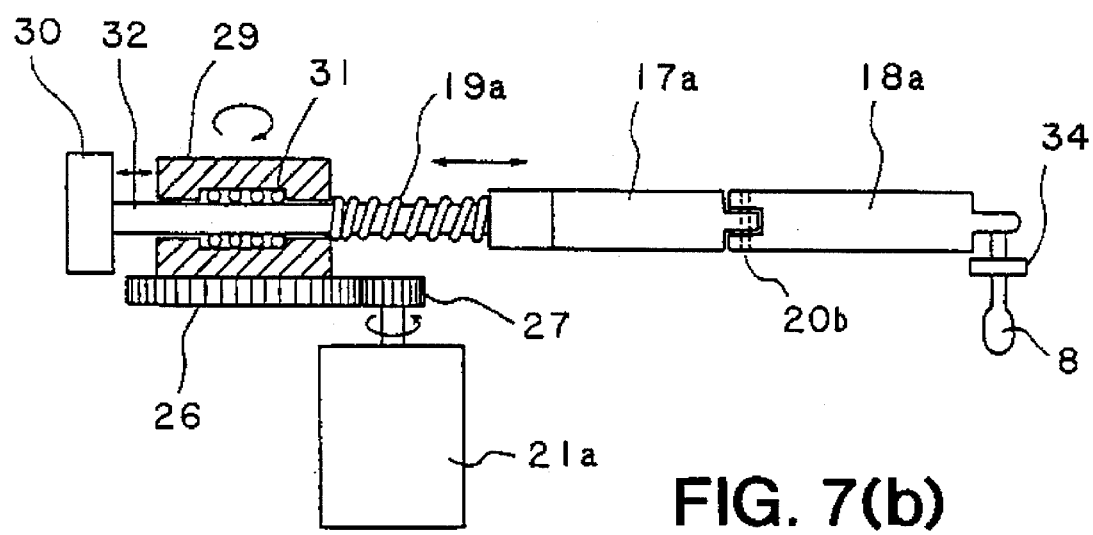

FIGS. 7(a) and 7(b) are diagrams of the threading arm of the second embodiment according to the present invention. FIG. 7(a) is a perspective view of the first arm 17a. FIG. 7(b) is a side elevational view of the threading arm and the drive mechanism, a sectional view being shown only for a frame 29.

In FIG. 7(a), two slide shafts 32 are inserted through springs 19a and a frame 29 with the first arm 17a attached thereto and an end plate 30 attached at one end. The frame 29 includes linear bearings 31 in contact with slide shafts 32 to allow the slide shafts 32 to slide smoothly through the frame 29. Thus, the first arm 17a moves only in the axial direction of the slide shafts 32 while compressing the springs 19a and, therefore, a first end of the first arm 17a never extends far beyond the position where the end plate 30 comes in contact with the frame 29.

FIG. 7(b) shows a state where the springs 19a are compressed and the end plate 30 is moved apart from the frame 29. A second end of the first arm 17a is rotatably coupled to a first end of the second arm 18a through the node 20b. At a second end of the second arm 18a, the pin 8 for pulling the leader-block 3 is provided. A bearing 34 is provided coaxially with respect to the pin 8 to allow the pin 8 to move smoothly along the guide groove 5b. The guide groove 5b is constructed by cutting a slot on the slide shaft 32. Thus, the first arm 17a can move rotationally as well as lengthwise.

The above-mentioned driven gear 26 reduces the rotational speed of the threading motor 21a and transmits a powerful drive force to the threading arm. The driven gear 26 is attached to the frame 29.

Figure 8A:
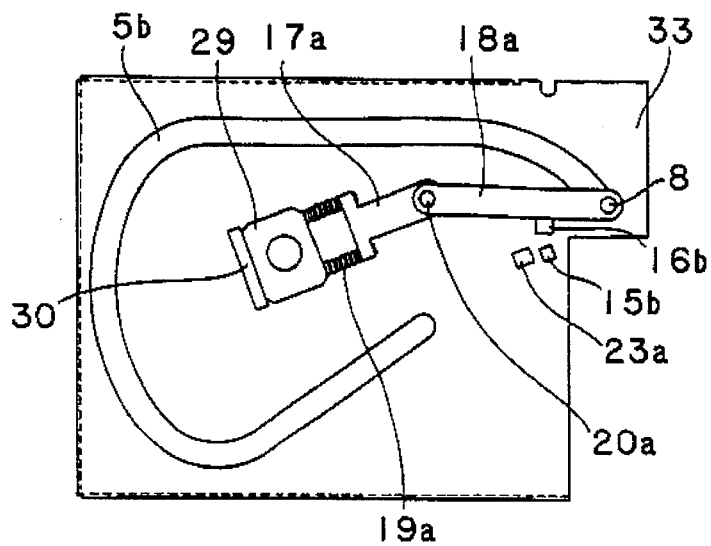
FIGS. 8(*a*)–8(*b*) are diagrams illustrating a threading operation according to the second embodiment of the present invention.
Figure 8B:
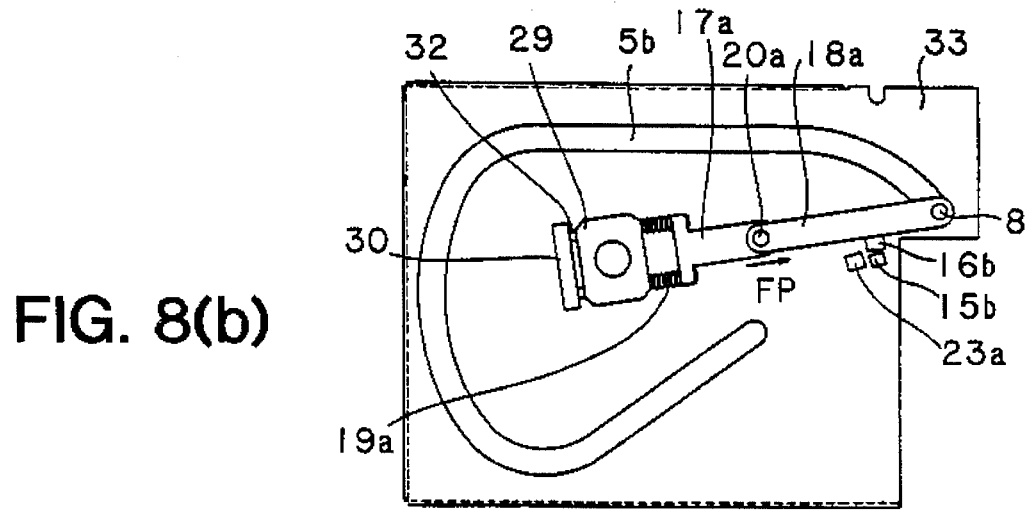
Figure 8C:
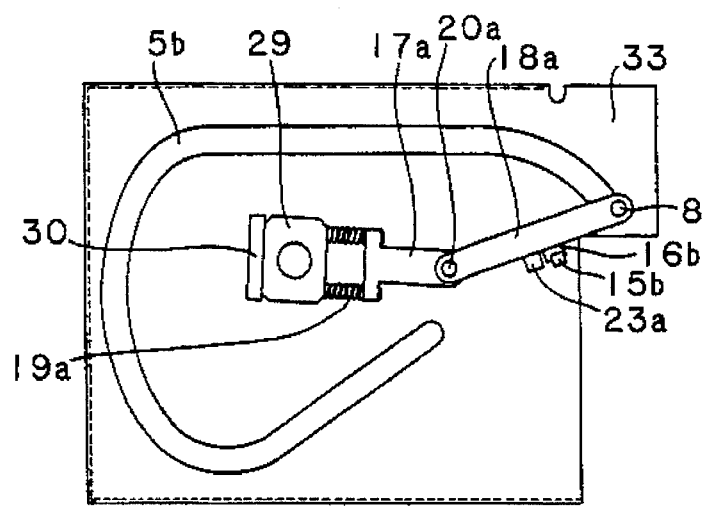
Figure 1A:
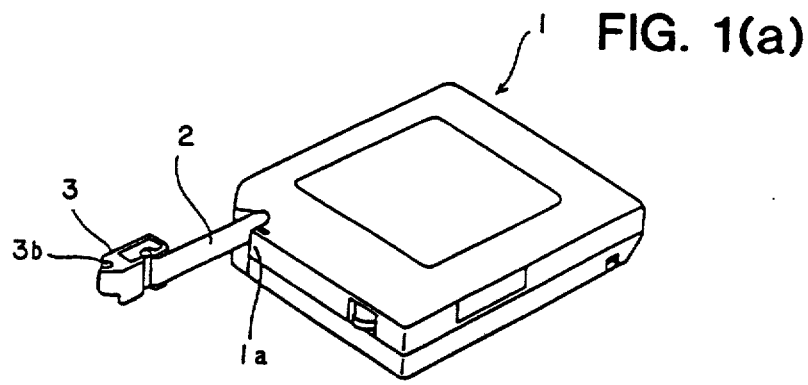
Figure 1B:
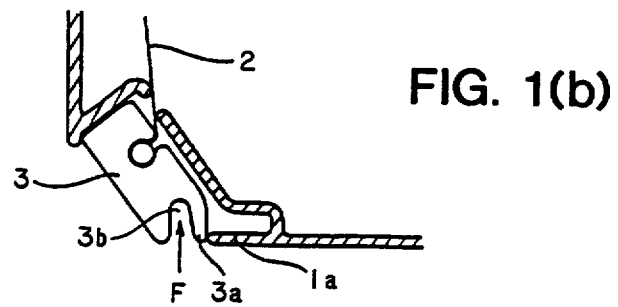
Figure 1C:
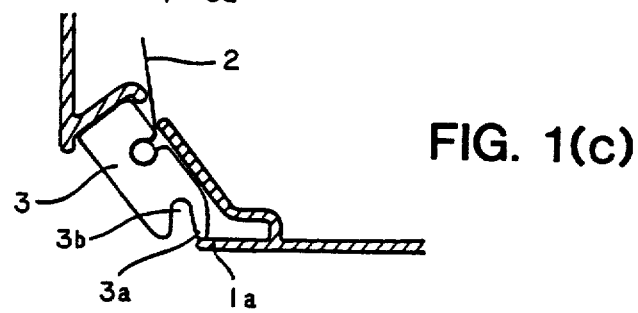
Figure 2:
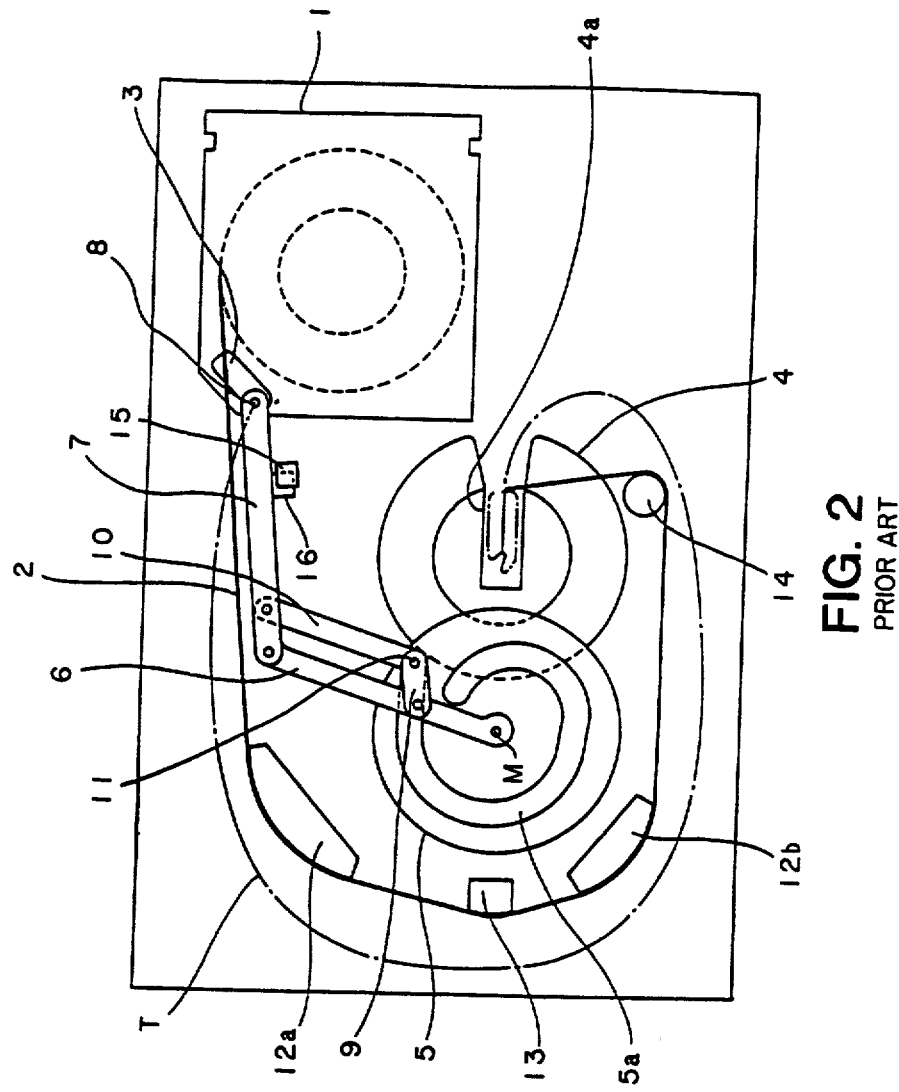
Figure 3:
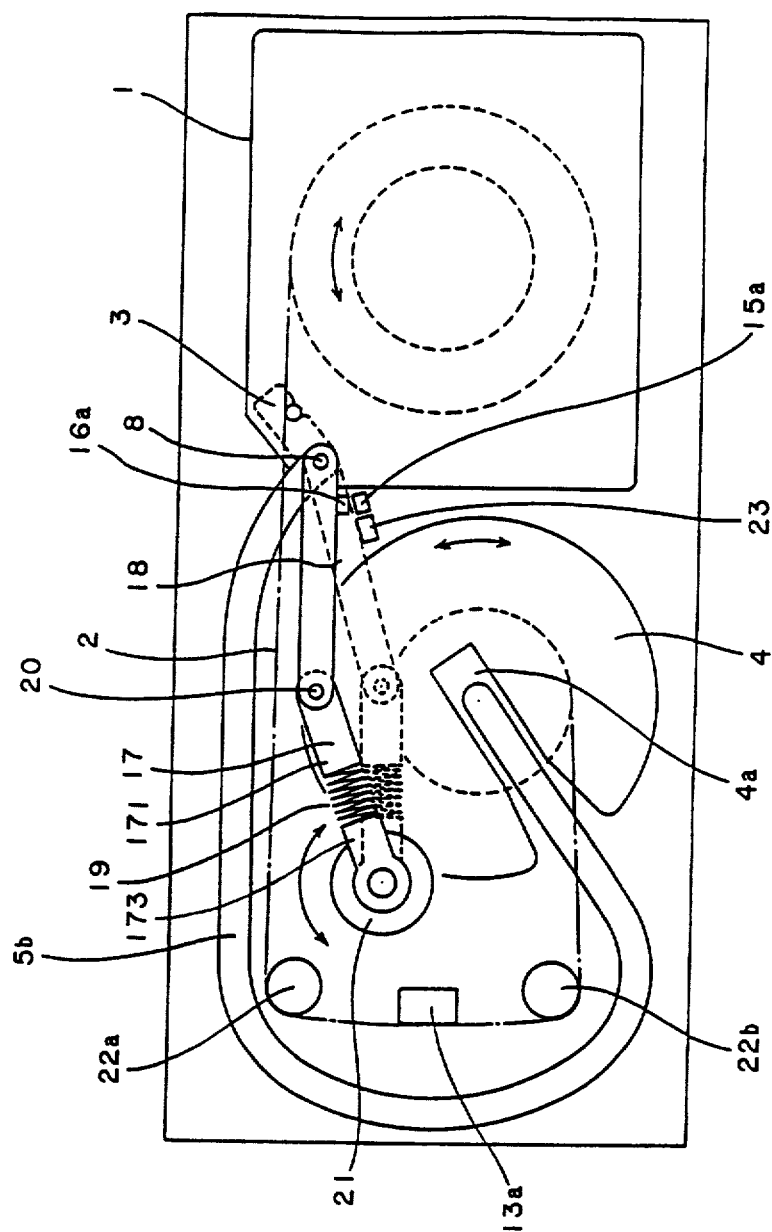
Figure 4:
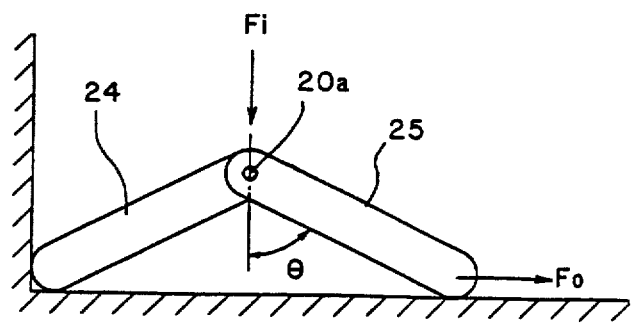
Figure 5A:
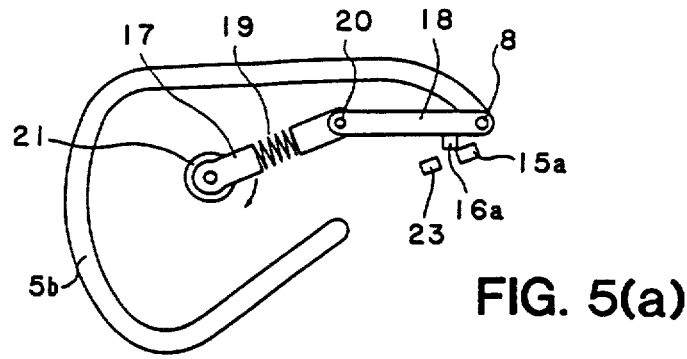
Figure 5B:
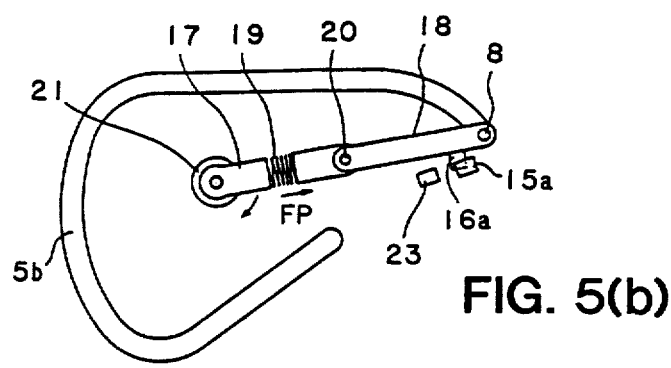
Figure 5C:
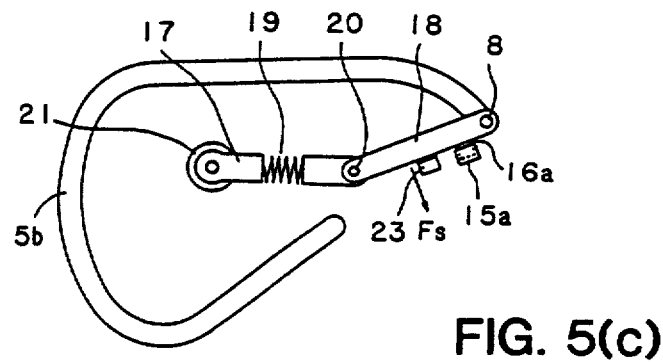
Figure 6:
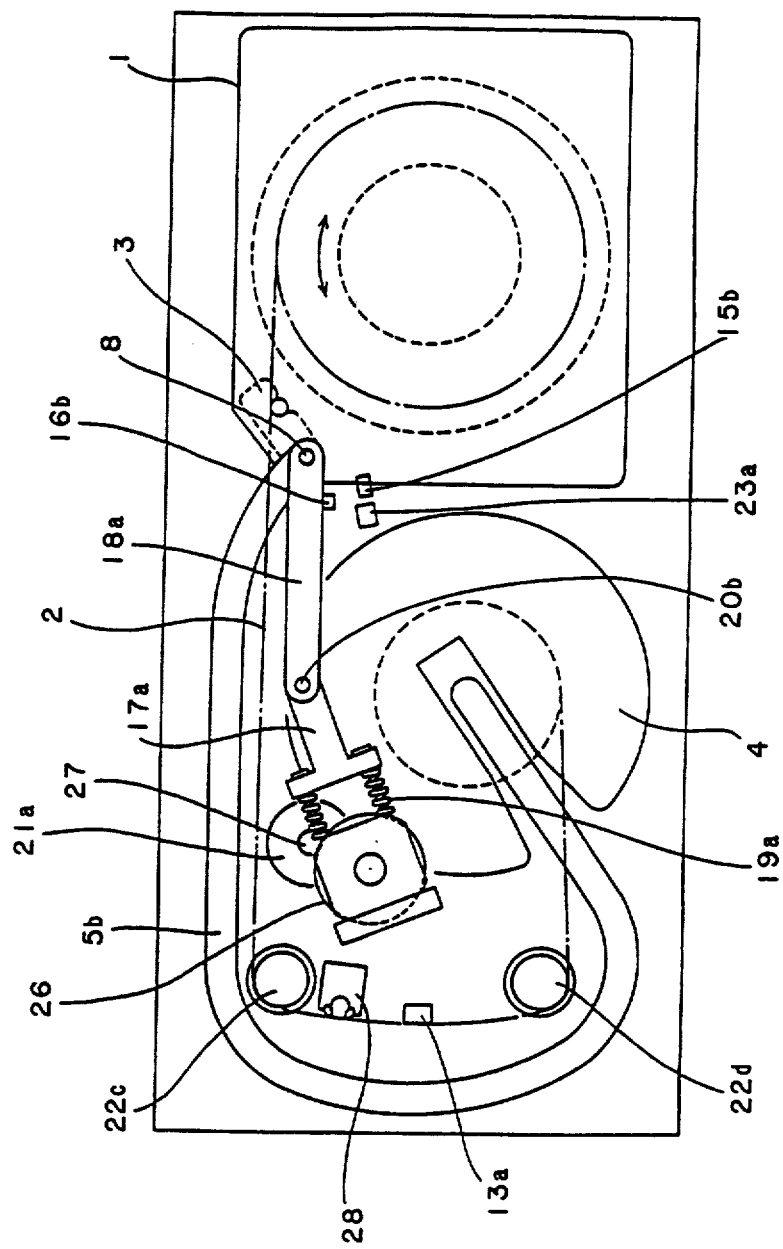
Figure 7A:
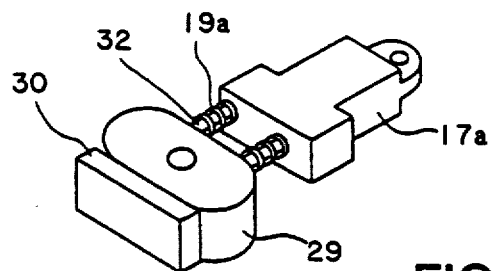
Figure 7B:
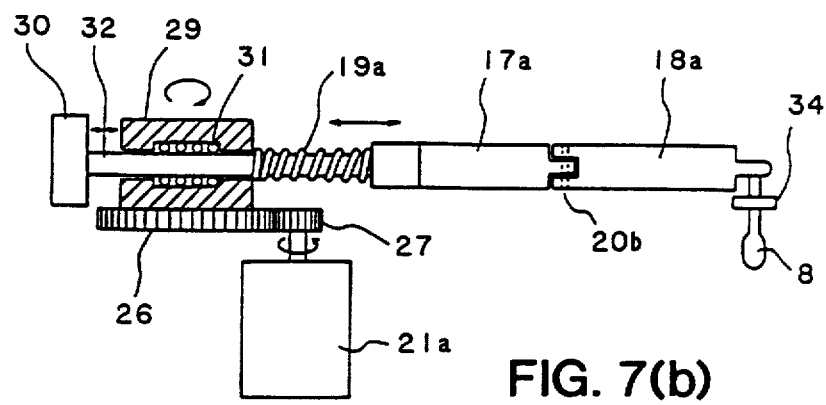
Figure 8A:
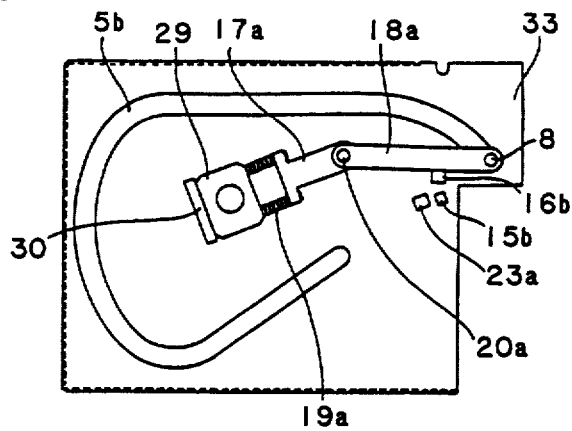
Figure 8B:
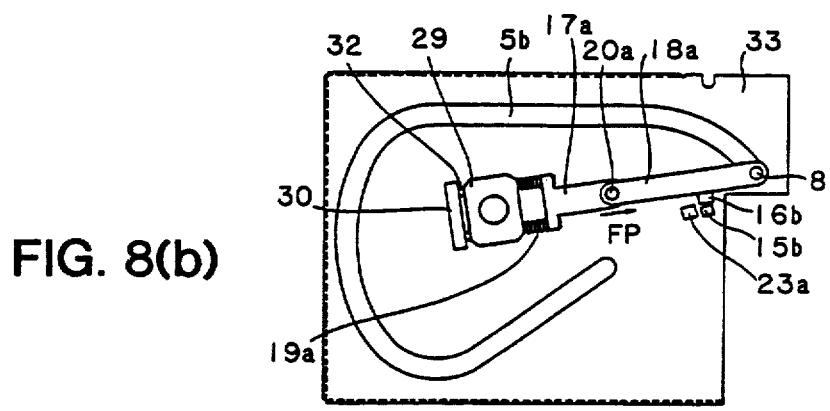
Figure 8C:
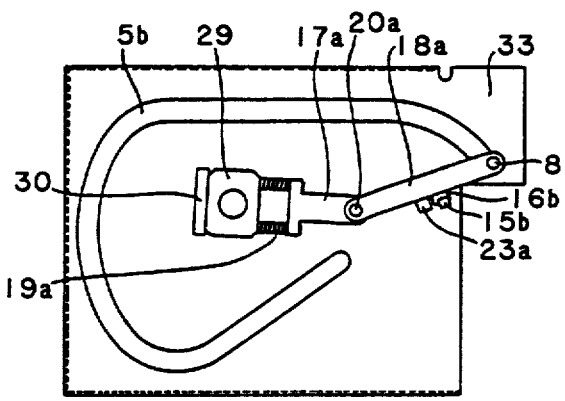

FIGS. 8(a)–8(c) are diagrams which show a threading operation of the threading mechanism according to the second embodiment of the present invention. FIGS. 8(a), 8(b) and 8(c) show the threading operation in sequence. Only the operation of inserting the leader-block 3, which is led to the cartridge opening by the pin 8 along the guide groove 5b, into the cartridge 1 is shown by FIGS. 8(a)–8(c).

The leader-block insertion operation is explained below in sequence. The leader-block insertion starting stage is shown in FIG. 8(a). The first arm 17a swings clockwise to make the pin 8 carry the leader-block 3 to the cartridge 1 opening. The first arm 17a and second arm 18a are doglegged at this point, since the total length of the arms is set longer than the distance between the leader-block pickup position and the rotational axis of the first arm 17a.

As shown in FIG. 8(b), the first arm 17a continues swinging clockwise and the doglegged arms 17a and 18a straighten as the spring 19a is compressed. The slide shafts 32 are pressed toward the frame 29 and the end plate 30 is separated from the frame 29. The threading arm including the first arm 17a and the second arm 18a pushes the leader-block 3 into the cartridge 1 with the force Fp which is equal to the force compressing the spring 19a. The repulsive force Fp of the spring 19a is set to, for example, 2.5 kg so that the leader-block 3 is securely inserted into the cartridge 1.

As shown in FIG. 8(c), as the first arm 17a continues swinging clockwise, the arms 17a and 18a become reversely doglegged after passing the straight state formed by the two arms 17a and 18a and stops swinging upon contact with the stopper 23a. In this stage, the force Fs which presses the arm 18a to the stopper 23a can always be obtained without a rotational torque from the threading motor 21 which swings the first arm 17a. Therefore, the threading mechanism can maintain a stable self-locking state.

The threading motor 21 stops rotating when the sensor 15b detects a flag 16b. Thus, if the sensor 15b continues to detect the flag 16b with the threading mechanism in a stable self-locking state, it is determined that the leader-block 3 has been securely inserted into the cartridge 1.

According to the present invention, the threading arm, which includes a linkage of two arms, one of which includes an elastic member, absorbs a shock caused when inserting a leader-block, inserts the leader-block with a small rotational torque and also maintains itself in a stable self-locked state at the leader-block pickup position. The sensor assures leader-block insertion by detecting the threading arm in the self-locked state. Accordingly, leader-block insertion can be stably and economically accomplished by a tape threading mechanism having the simple configuration of the present invention.

The foregoing is considered as illustrative only of the principles of the present invention. Further, since numerous modifications and changes will readily occur to those skilled in the art, it is not desired to limit the invention to the exact construction and applications shown and described. Accordingly, all suitable modifications and equivalents may be resorted to, falling within the scope of the invention and the appended claims and their equivalents.

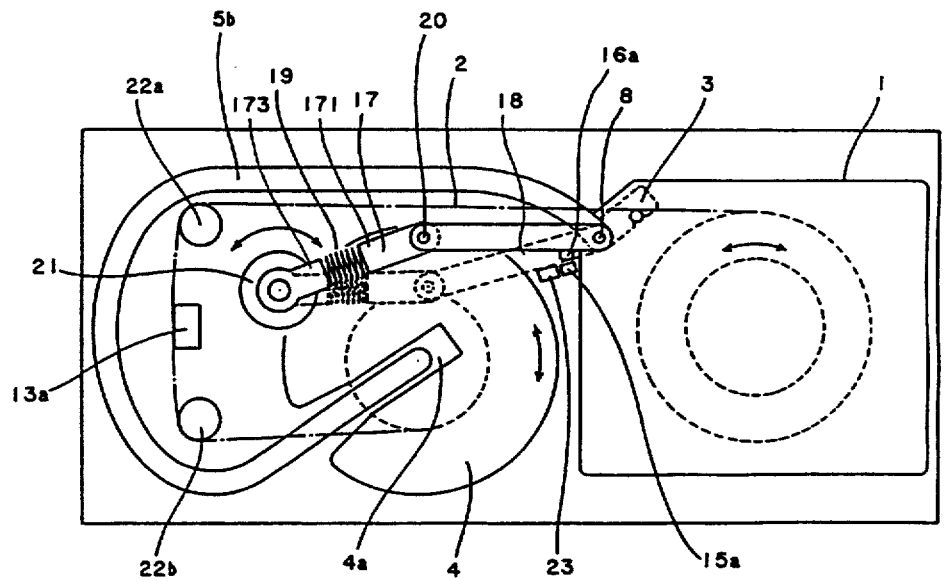

What is claimed is:

1. A tape threading apparatus in a tape unit including a tape running path and a machine reel, for pulling a leader-block having a leader-block opening and attached at an end of a tape, out from a tape cartridge mounted on the tape unit, passing the tape through and drawing out the tape from the tape running path and inserting the leader-block back into the tape cartridge, said tape threading apparatus comprising:

a pin for engaging the leader-block opening;

guidance means for guiding said pin between the tape cartridge and the machine reel; and a threading arm for carrying the leader-block, said threading arm having a first end connected to a rotational pivot and a second end provided with said pin, said threading arm including:

a linkage of at least three arms and an elastic member, first and second ones of said at least three arms being rotatably coupled, said elastic member coupled between said second one of said at least three arms and a third one of said at least three arms so that said threading arm expands and contracts lengthwise, said first one of said at least three arms having a first portion connected to said pin and a second portion connected to said second one of said at least three arms such that said first one of said at least three arms is inclined in a first direction with respect to said second one of said at least three arms when the leader-block is being inserted in the tape cartridge, and said first one of said at least three arms is inclined in a second direction opposite the first direction with respect to said second one of said at least three arms after the leader-block has been inserted in the tape cartridge, the total length of said threading arm is set such that, when the threading arm is extended straight, the distance between the rotational pivot and said pin is longer than the distance between the rotational pivot and the leader-block opening when the leader-block is inserted in the tape cartridge.

2. A tape threading apparatus according to claim 1, said apparatus further comprising:

a stopper provided on the tape unit, for contacting said threading arm to stop said threading arm at a position when insertion of the leader-block in the tape cartridge is completed.

3. A tape threading apparatus according to claim 2, further comprising:

sensor means, provided on the tape unit, for sensing said threading arm and detecting that insertion of the leader-block in the tape cartridge is completed.

4. A tape threading apparatus according to claim 3, further comprising a motor connected to said threading arm for rotating said threading arm, wherein said sensor means, in dependence upon the detecting, causes said motor to stop.

5. A tape threading apparatus according to claim 1, wherein a bearing is provided coaxially at said pin so that said bearing rotatably moves along said guidance means as said threading arm rotates.

6. A tape threading apparatus in a tape unit including a tape running path and a machine reel, for pulling a leader-block having a leader-block opening and attached at an end of a tape, out from a tape cartridge mounted on the tape unit, passing the tape through and drawing out the tape from the tape running path and inserting the leader-block back into the tape cartridge, said tape threading apparatus comprising:

a pin for engaging the leader-block opening;

guidance means for guiding said pin between the tape cartridge and the machine reel; and a threading arm for carrying the leader-block, said threading arm having a first end connected to a rotational pivot and a second end provided with said pin, said threading arm including:

a linkage of at least two arms and an elastic member, first and second ones of said at least two arms being rotatably coupled, said elastic member coupled between said rotational pivot and said second arm of said at least two arms so that said threading arm expands and contracts lengthwise, said first one of said at least two arms having a first portion connected to said pin and a second portion connected to said second one of said at least two arms such that said first one of said at least two arms is inclined in a first direction with respect to said second one of said at least two arms when the leader block is being inserted in the tape cartridge, and said first one of said at least two arms is inclined in a second direction opposite the first direction with respect to said second one of said at least two arms after the leader block has been inserted in the tape cartridge, the total length of said threading arm is set such that, when the threading arm is extended straight, the distance between the rotational pivot and said pin is longer than the distance between the rotational pivot and the leader-block opening when the leader-block is inserted in the tape cartridge.

7. A tape threading apparatus according to claim 6, wherein said elastic member comprises a coil spring, said tape threading arm further comprising:

an end plate;

a frame including bearings; and a shaft contacting said bearings and connected to said threading arm at one end and coupled to said end plate at another end, said coil spring having said shaft extending therethrough.

8. A tape threading apparatus according to claim 6, wherein said elastic member comprises a coil spring, said tape threading arm further comprising:

an end plate;

a frame connected to said threading arm and coupled to said end plate and including bearings; and a shaft contacting said bearings and connected to said threading arm at one end and coupled to said end plate at another end, said coil spring having said shaft extending therethrough.

9. A tape threading apparatus according to claim 8, wherein a bearing is provided coaxially at said pin so that said bearing rotatably moves along said guidance means as said threading arm rotates.

10. A magnetic tape unit including a tape running path and a machine reel and having a tape threading apparatus for pulling a leader-block having a leader-block opening and attached to an end of a tape out from a tape cartridge mounted on the tape unit, passing the tape through and drawing out the tape from the tape running path and inserting the leader-block back into the tape cartridge, said tape threading apparatus comprising:

a pin for engaging the leader-block opening;

a threading arm for carrying the leader-block, said threading arm having a first end connected to a rotational pivot and having a second end provided with said pin, said threading arm including at least two arms rotatably coupled to each other, a first one of said at least two arms having a first portion connected to said pin and a second portion rotatably connected to a second one of said at least two arms such that said first one of said at least two arms is inclined in a first direction with respect to said second one of said at least two arms when the leader-block is being inserted in the tape cartridge, and said first one of said two arms is inclined in a second direction opposite the first direction with respect to said second one of said two arms after the leader block has been inserted in the tape cartridge, the total length of said threading arm is set such that, when the threading arm is extended straight, the distance between the rotational pivot and said pin is longer than the distance between the rotational pivot and the leader block opening when the leader block is inserted in the tape cartridge, at least one of said two arms having an elastic member included therein which allows said threading arm to expand and contract lengthwise when the threading arm is inserting the leader-block into the tape cartridge so that a required leader-block insertion force is provided; and guidance means for guiding said pin between the tape cartridge and the machine reel.

11. A magnetic tape unit according to claim 10, further comprising:

a stopper, provided on the magnetic tape unit, for contacting said first one of said at least two arms to stop said first one of said at least two arms when insertion of the leader block in the tape cartridge is completed; and sensor means provided on the magnetic tape unit, for sensing said first one of said at least two arms and detecting that insertion of the leader-block in the tape cartridge is completed.

12. A tape threading apparatus used in a tape unit including a tape running path for threading and unthreading a tape, the tape having a leader-block attached to one end thereof and the leader block inserted in a tape cartridge, said tape threading apparatus comprising:

guidance means for engaging a portion of the leader block and guiding the leader block into and out of the tape cartridge;

a tape threading arm comprising:

a first arm having first and second ends, the first end of said first arm connected to said guidance means;

a second arm having first and second ends, said second arm including an elastic member permitting said second arm to expand and contract lengthwise, the second end of said second arm connected to a rotational pivot, the first end of said second arm rotatably connected to the second end of said first arm, said first arm is inclined in a first direction with respect to said second arm when the leader-block is being inserted in the tape cartridge and said first arm is inclined in a second direction, opposite the first direction with respect to said second arm after the leader block has been inserted in the tape cartridge, the total length of said tape threading arm is set such that, when the threading arm is extended straight, the distance between the rotational pivot and said guidance means is longer than the distance between the rotational pivot and the leader-block portion when the leader-block is inserted in the tape cartridge;

threading motor means, connected to the second end of said second arm, for rotating said tape threading arm, and for inserting and extracting the leader-block into and from the tape cartridge;

sensor means for sensing said first arm and for detecting that insertion of the leader-block in the tape cartridge is completed and stopping said threading motor means; and stopping means provided on the tape unit, for contacting said first arm to stop said first arm when insertion of the leader-block in the tape cartridge is completed.

13. A tape threading apparatus according to claim 12, wherein said second arm comprises:

a frame operatively connected to said threading motor means;

a sliding shaft inserted through said frame and connected to the second end of said first arm;

a coil spring having said sliding shaft extending therethrough; and bearings located inside said frame and contacting said sliding shaft.

14. A tape threading apparatus according to claim 12, wherein said elastic member comprises a single spring.

15. A tape threading apparatus in a tape unit including a tape running path and a machine reel, for pulling a leader-block having a leader-block opening and attached at an end of a tape, out from a tape cartridge mounted on the tape unit, passing the tape through and drawing out the tape from the tape running path and inserting the leader-block back into the tape cartridge, said tape threading apparatus comprising:

a pin for engaging the leader-block opening;

guidance means for guiding said pin between the tape cartridge and the machine reel;

a threading arm for carrying the leader-block, said threading arm having a first end connected to a rotational pivot and a second end provided with said pin, said threading arm including:

a linkage of at least three arms and an elastic member, first and second arms being rotatably coupled, said elastic member being coupled between said second arm and a third one of said at least three arms so that said threading arm expands and contracts lengthwise, the total length of said threading arm is set such that, when the threading arm is extended straight, the distance between the rotational pivot and said pin is longer than the distance between the rotational pivot and the leader-block opening when the leader-block is inserted in the tape cartridge, said first arm having a first portion connected to said pin and a second portion rotatably connected to said second arm such that said first arm is inclined in a first direction with respect to said second arm when the leader-block is being inserted in the tape cartridge, and said first arm is inclined in a second direction opposite to the first direction with respect to said second arm after the leader-block has been inserted in the tape cartridge; and a stopper, provided on the tape unit, for contacting said first arm to stop said first arm when insertion of the leader-block in the tape cartridge is completed.

16. A magnetic tape unit including a tape running path and a machine reel and having a tape threading apparatus for pulling a leader-block having a leader-block opening and attached to an end of a tape out from a tape cartridge mounted on the tape unit, passing the tape through and drawing out the tape from the tape running path and inserting the leader-block back into the cartridge, said tape threading apparatus comprising:

a pin for engaging the leader-block opening;

a threading arm for carrying the leader-block, said threading arm having a first end connected to a rotational pivot and a second end provided with said pin, said threading arm including at least two arms rotatably coupled to each other, and a second portion rotatably connected to a second one of said at least two arms such that said first one of said at least two arms is inclined in a first direction with respect to said second one of said at least two arms when the leader block is being inserted in the tape cartridge, and said first one of said at least two arms is inclined in a second direction opposite to the first direction with respect to said second one of said at least two arms after the leader-block has been inserted in the tape cartridge, the total length of said threading arm is set such that, when the threading arm is extended straight, the distance between the rotational pivot and said pin is longer than the distance between the rotational pivot and the leader-block opening when the leader-block is inserted in the tape cartridge, and said threading arm including an elastic member connected therein which allows said threading arm to expand and contract lengthwise when said threading arm is inserting the leader-block into the tape cartridge so that a shock caused to an arm drive system including said threading arm is absorbed and a required leader-block insertion force is provided;

guidance means for guiding said pin between the tape cartridge and the machine reel;

a stopper provided on the magnetic tape unit, for contacting said first one of said at least two arms to stop said first one of said at least two arms when insertion of the leader-block in the tape cartridge is completed; and sensor means provided on the magnetic tape unit for detecting said first one of said at least two arms and detecting that insertion of the leader-block in the tape cartridge is completed.

17. A tape threading apparatus used in a tape unit including a tape running path for threading and unthreading a tape, the tape having a leader-block attached to one end thereof and the leader-block inserted in a tape cartridge, said tape threading apparatus comprising:

guidance means for engaging a portion of the leader block and guiding the leader-block into and out of the tape cartridge;

a tape threading arm comprising:

a first arm having first and second ends, the first end of said first arm connected to said guidance means;

a second arm having first and second ends and including an elastic member connected therebetween, the elastic member comprising a single spring permitting said second arm to expand and contract lengthwise, the second end of said second arm connected to a rotational pivot, the first end of said second arm rotatably connected to the second end of said first arm, such that said first arm is inclined in a first direction with respect to said second arm when the leader block is being inserted in the tape cartridge, and said first arm is inclined in a second direction opposite to the first direction with respect to said second arm after the leader block has been inserted in the tape cartridge, the total length of said threading arm is set such that, when the threading arm is extended straight, the distance between the rotational pivot and said guidance means is longer than the distance between a rotational pivot and the leader-block portion when the leader-block is inserted in the tape cartridge;

threading motor means connected to the second end of said second arm, for rotating said tape threading arm, and for inserting and extracting the leader-block into and out of the tape cartridge;

sensor means for sensing said first arm and for detecting that insertion of the leader-block in the tape cartridge is completed and stopping said threading motor means; and stopping means provided on the tape unit for contacting said first arm to stop said first arm when insertion of the leader-block in the tape cartridge is completed.

* * * * *

UNITED STATES PATENT AND TRADEMARK OFFICE
CERTIFICATE OF CORRECTION

PATENT NO. : 5,542,620
DATED : Aug. 6, 1996
INVENTOR(S) : OHSHITA

It is certified that error appears in the above-indentified patent and that said Letters Patent is hereby corrected as shown below:

The title page should be deleted and substitute therefor the attached title page.

On the title page, under "FOREIGN PATENT DOCUMENTS", delete second occurrence of "62-231451 10/1987 Japan ."

Delete Drawing Sheets 1-8 and substitute therefor the Drawing Sheets consisting of FIGS.1(a) - 8(c), as shown on the attached pages.

Col. 1, line 43, change "3 which" to --3, which--.

Col. 4, line 8, change "openings" to --opening--;
line 9, after "18" insert --(e.g., arm 17 in FIG. 3)--;
line 10, delete "(e.g., arm 17 in FIG. 3)";
line 35, change "leaner-block" to --leader-block--.

Col. 5, line 9, delete the paragraph indention.

Signed and Sealed this

Twenty-first Day of January, 1997

Attest:

BRUCE LEHMAN

Attesting Officer    Commissioner of Patents and Trademarks

United States Patent [19]
Ohshita

[11] Patent Number: 5,542,620
[45] Date of Patent: Aug. 6, 1996

[54] TAPE THREADING APPARATUS USED IN A TAPE UNIT

[75] Inventor: Masaru Ohshita, Yokohama, Japan

[73] Assignee: Fujitsu Limited, Kawasaki, Japan

[21] Appl. No.: 462,562

[22] Filed: Jun. 5, 1995

Related U.S. Application Data

[63] Continuation of Ser. No. 173,156, Dec. 22, 1993, abandoned, which is a continuation of Ser. No. 728,626, Jul. 11, 1991, abandoned.

[30] Foreign Application Priority Data

Jul. 18, 1990 [JP] Japan ................... 2-191017

[51] Int. Cl.⁶ ........................................... G11B 15/00
[52] U.S. Cl. ............................. 242/332.4; 242/332.8
[58] Field of Search .............................. 242/195, 197, 242/332.1, 332.4, 332.5, 332.8, 532.6; 360/95; 352/158; 226/92

[56] References Cited

U.S. PATENT DOCUMENTS 4,608,614  8/1986  Rinkleib et al. ................ 242/195
4,679,747  7/1987  Smith ............................ 242/195

FOREIGN PATENT DOCUMENTS 60-10446    1/1985   Japan .
62-119765   6/1987   Japan .
62-231451   10/1987  Japan .
62-231451   10/1987  Japan .
62-257657   11/1987  Japan .
60-10360    1/1988   Japan .

Primary Examiner—John Q. Nguyen
Attorney, Agent, or Firm—Staas & Halsey

[57] ABSTRACT

A tape threading mechanism for a magnetic tape unit uses a cartridge-contained magnetic tape with a leader-block attached at an end of the magnetic tape. The tape threading mechanism pulls out the leader-block from the cartridge, performs a tape threading/unthreading and inserts the leader-block back into the cartridge by way of a threading arm. The threading arm is connected to a rotational axis thereof at a first end. A second end of the threading arm is provided with a pin for carrying the leader-block and includes a linkage of at least two arms. At least one of the two arms has an elastic member which allows the threading arm to expand and contract lengthwise.

17 Claims, 8 Drawing Sheets